US009965142B2

(12) United States Patent
Duplessis et al.

(10) Patent No.: US 9,965,142 B2
(45) Date of Patent: May 8, 2018

(54) DIRECT MANIPULATION USER INTERFACE FOR SMART OBJECTS

(71) Applicant: Microsoft Technology Licensing, LLC, Redmond, WA (US)

(72) Inventors: Jean Pierre Duplessis, Kirkland, WA (US); Monty Hammontree, Duvall, WA (US); Xiaoji Chen, Seattle, WA (US); Emmanuel Athans, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 639 days.

(21) Appl. No.: 13/689,739

(22) Filed: Nov. 29, 2012

(65) Prior Publication Data

US 2014/0149944 A1    May 29, 2014

(51) Int. Cl.
*G06F 3/0484* (2013.01)
*G06F 3/0481* (2013.01)
*G06T 15/00* (2011.01)
*G06T 15/08* (2011.01)
*G06T 19/20* (2011.01)

(52) U.S. Cl.
CPC ...... *G06F 3/04815* (2013.01); *G06F 3/04845* (2013.01); *G06T 15/00* (2013.01); *G06T 15/08* (2013.01); *G06T 19/20* (2013.01)

(58) Field of Classification Search
CPC .......... G06T 15/00; G06T 17/00; G06T 19/00
USPC ....... 715/849, 706, 757, 764, 771, 773, 848; 345/419, 420
See application file for complete search history.

(56) References Cited

U.S. PATENT DOCUMENTS

| 4,158,481 | A | 6/1979 | Hoyer | |
|---|---|---|---|---|
| 4,791,581 | A * | 12/1988 | Ohba | 345/585 |
| 6,629,065 | B1 | 9/2003 | Gadh et al. | |
| 7,557,736 | B1 | 7/2009 | Daily et al. | |
| 2004/0095352 | A1 | 5/2004 | Huang | |
| 2008/0126934 | A1 * | 5/2008 | Bray | G06F 3/04815 715/713 |
| 2010/0105443 | A1 * | 4/2010 | Vaisanen | 455/566 |
| 2010/0138759 | A1 | 6/2010 | Roy | |
| 2010/0315424 | A1 | 12/2010 | Cai | |
| 2011/0164029 | A1 * | 7/2011 | King et al. | 345/419 |
| 2014/0304272 | A1 * | 10/2014 | Park et al. | 707/740 |

OTHER PUBLICATIONS

"Maya-Finishing the Head from Tutorial 4" (published on Dec. 19, 2011) https://web.archive.org/web/20111219005823/http://www.ideepix.nl/ARIL/3D/maya/?show=14.*

(Continued)

*Primary Examiner* — Rinna Yi

(57) ABSTRACT

A direct manipulation user interface provides a user with a means to interact with control points associated with smart objects to create and modify complex 3D graphic objects. The direct manipulation user interface includes a precision control mechanism that enables a user to specify precise measurements for a transformation through the user's interaction with a control point. The direct manipulation user interface also includes a history bar that enables a user to scroll back to a previous stage in the design process and to undo a sequence of transformations through the user's interaction with the history bar.

21 Claims, 15 Drawing Sheets

(56) References Cited

OTHER PUBLICATIONS

"GP2 3D Object Editing for Beginners" (published on Aug. 9, 2011) https://web.archive.org/web/20110809055140/http://grandprix2.de/Anleitung/tutus/3D_Object_Editing/3d_object_editing.htm.*

Glevins, Neil ("Modeling Using the 3DSMax Modifier Stack", published Mar. 3, 2011) http://en.render.ru/books.show_book.php?book_id=1014.* http://www.trixiescraps.com/2011/11/tips-tricks-and-techniques-tuesday.html Tips, Tricks, and Techniques Tuesday: Creating a White Space Template (posted on Nov. 29, 2011).*

Yu, et al., "FI3D: Direct-Touch Interaction for the Exploration of 3D Scientific Visualization Spaces", Retrieved at <<http://hal.inria.fr/docs/00/58/73/77/PDF/Yu_2010_FDT.pdf>>, In Proceedings of IEEE Trans. Vis. Comput. Graph., Nov. 2010, vol. 16, pp. 1613-1622.

Sharma, et al., "MozArt: A Multimodal Interface for Conceptual 3D Modeling", Retrieved at <<http://www.hpl.hp.com/india/documents/papers/icmi4111d-sharma-madhvanath.pdf>>, ICMI '11 Proceedings of the 13th International Conference on Multimodal Interfaces, Nov. 18, 2011, pp. 307-310.

Billinghurst, et al., "3D Palette: A Virtual Reality Content Creation Tool", Retrieved at: <<http://www.hitl.washington.edu/publications/r-97-23/>>, Proceedings of the ACM Symposium on Virtual Reality Software and Technology, Aug. 1997, pp. 155-156.

"Surface Editing", Retrieved at <<http://wiki.blender.org/index.php/Doc:2.4/Manual/Modeling/Surfaces/Editing>>, Retrieved Date: Jun. 26, 2012, pp. 12.

Au, et al., "Multitouch Gestures for Constrained Transformation of 3D Objects", Retrieved at <<http://visgraph.cse.ust.hk/projects/multitouch/EG12-manipulation.pdf>>, Computer Graphics Forum, vol. 31, May 2012, pp. 651-660.

Ballard, et al., "Computer Vision", Prentice-Hall, Inc., 1982, Appendix A1.7, 16 Page.

Autodesk, "AutoCAD 2012 User's Guide", Autodesk, Inc., 2011, 11 Pages.

"Non-Final Office Action Issued in U.S Appl. No. 13/689,738", dated Dec. 14, 2014, 38 Pages.

"Final Office Action Issued in U.S Appl. No. 13/689,738", dated May 12, 2015, 48 Pages.

"Notice of Allowance Issued in U.S Appl. No. 13/689,738", dated Sep. 25, 2015, 14 Pages.

* cited by examiner

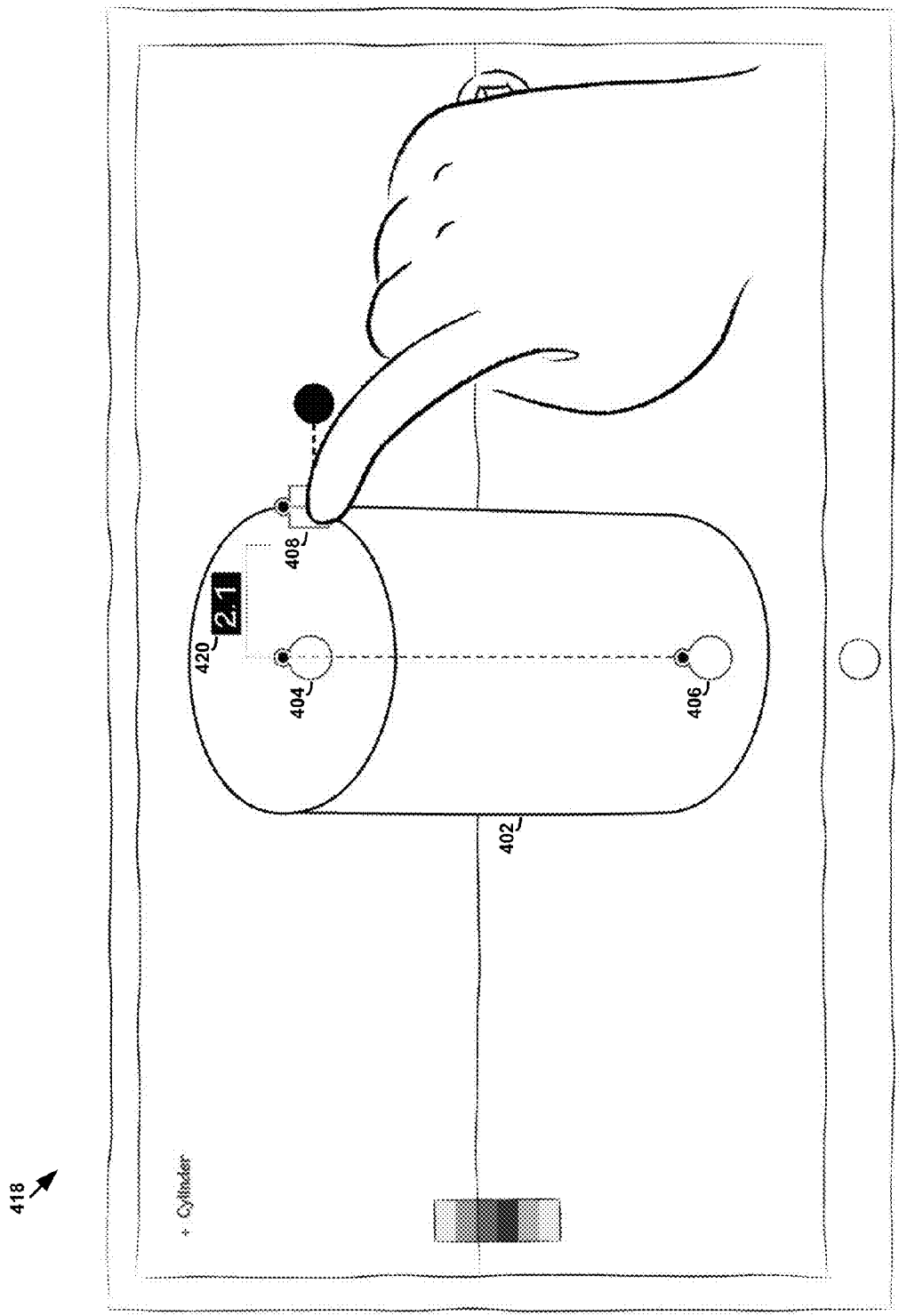

DIRECT MANIPULATION USER INTERFACE FOR SMART OBJECTS

CROSS REFERENCE TO RELATED APPLICATIONS

This application is related in subject matter to U.S. Pat. No. 9,311,755 entitled "SELF-DISCLOSING CONTROL POINTS" filed Nov. 29, 2012.

BACKGROUND

Computer graphic applications typically include a user interface consisting of icons, menu options, and tools that enable a user to generate three-dimensional (3D) digital images. A user may need to invest a considerable amount of time to learn the complexities of the user interface in order to generate an image. A user may have to learn which combination of menus, buttons, keystrokes, and/or mouse clicks are needed to generate a sequence of transformations to create an image in an intended manner. In some cases, the user interface may lack the capabilities to specify exact dimensions, tolerances, and positions needed to generate an image. In other cases, a user may be required to understand the complexities of computer graphics modeling or to develop an expertise in the use of the computer graphics tool. For users not familiar with computer graphics modeling or the nuances of a computer graphics tool, a substantial effort may be involved.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A direct manipulation user interface enables users to interact with control points associated with smart objects to create and modify 3D graphic objects. A smart object is a 3D graphics object that has control points embedded in areas of the object that are more likely to be used to perform a transformation on a graphics object. The user may utilize the control points to perform a series of transformations in order to create a particular image without requiring expertise in the underlying application. Through the use of the direct manipulation user interface, a user may perform simple and complex transformations to create and modify a 3D graphics object easily.

The direct manipulation user interface includes a precision control mechanism that enables a user to specify precise measurements for a transformation through the user's interaction with a control point. A user's touch of a control point can initiate various levels of measurement units that may be displayed for the user to use in initiating precise control over a transformation.

The direct manipulation user interface also includes a history bar that enables a user to scroll back to a previous stage in the design process. A user may select a particular stage in the design process to undo through the user's interaction with the history bar.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF DRAWINGS

FIGS. 4A-4D are exemplary illustrations showing the use of the precision control mechanism.

DETAILED DESCRIPTION

Various embodiments pertain to a direct manipulation user interface for smart objects. The direct manipulation user interface enables a user to interact directly with control points on a smart object in order to manipulate the smart object in a user-specified manner In this manner, a novice user may create and/or modify 3D graphic objects easily.

A smart object is a 3D graphics object that contains control points that are automatically displayed to the user with the 3D graphics object. The control points are positioned in areas where transformations are more likely to be made. A user may manipulate a control point in an intended manner in order to apply a transformation on the object. A transformation may be an action along one or more axes, such as, rotation, scaling, and translation. The user may utilize the control points to perform a series of transformations on the smart object in order to create and/or modify a two-dimensional (2D) or 3D graphics image.

The direct manipulation user interface may include a precision control mechanism. The precision control mechanism enables a user to fine tune a transformation by specifying precise dimensions, tolerances, and positions. The precision control mechanism is activated by a user interacting with a control point associated with the smart object. One or more menus having subunit measurements may be displayed through the user's interaction with a control point.

The direct manipulation user interface may also include a history stack. The history stack enables a user to undo and redo transformations at various points in the design process. A history stack module displays a history bar that enables a user to scroll through the various transformations made to the object. The user may then use the history bar to select a previous stage at which to revert back to.

Figure 1:
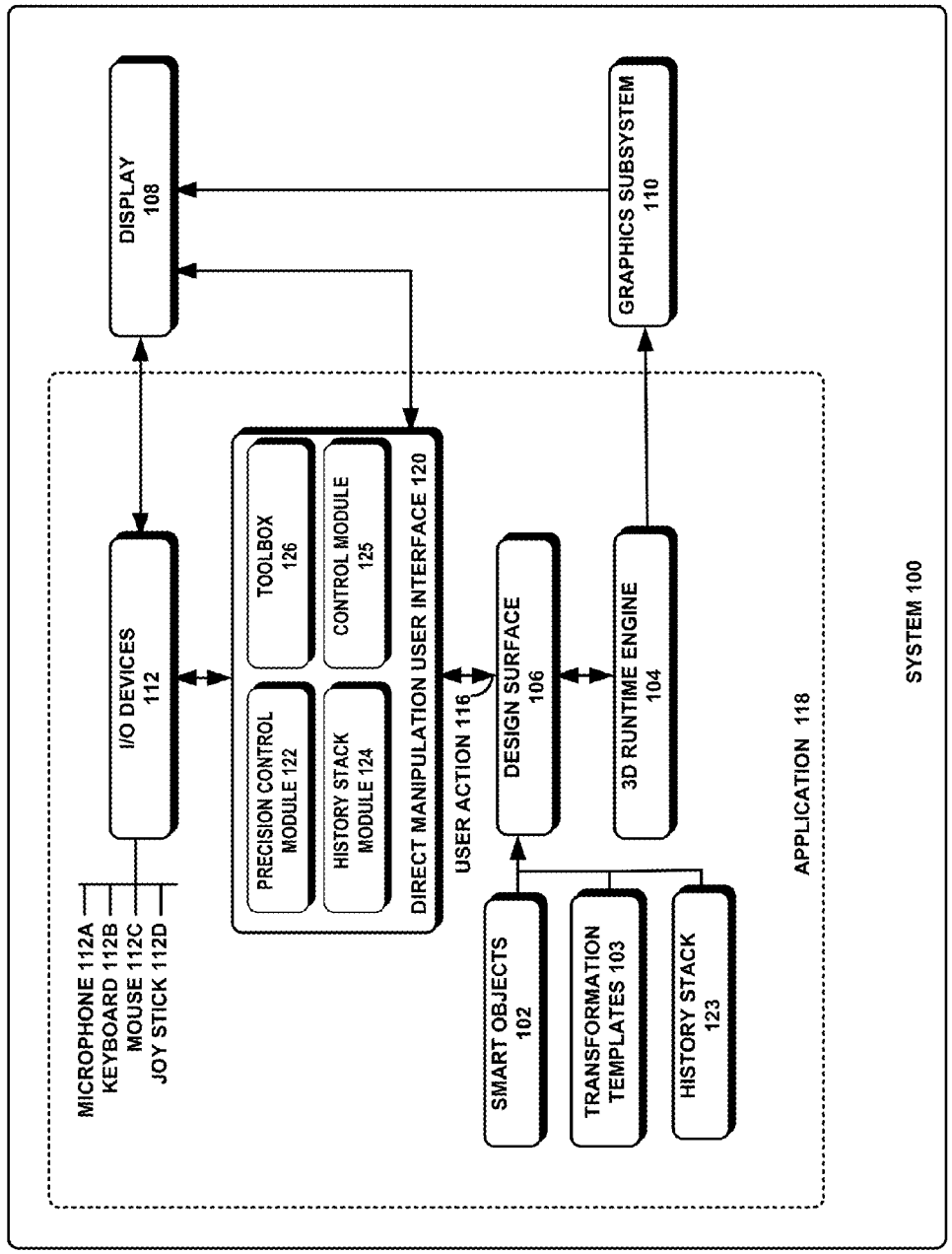
FIG. 1 is a block diagram illustrating an exemplary system utilizing a direct manipulation user interface.

Attention now turns to a discussion of a system that utilizes such a direct manipulation user interface. Turning to FIG. 1, there is shown a system 100 having at least a smart object 102, transformation templates 103, a history stack 123, a 3D runtime engine 104, a design surface 106, a display 108, a graphics subsystem 110, one or more input devices 112, and a direct manipulation user interface 120. Although the system 100 as shown in FIG. 1 has a limited number of elements in a certain topology, it may be appreciated that the system 100 may include more or less elements in alternate topologies as desired for a given implementation.

A smart object 102 describes a 3D graphics object having self-disclosed control points. A 3D graphics object may be composed of surfaces and lines that when rendered make the object appear real. Surfaces and lines are represented as complex mathematical expressions that are defined by a set of control points. A control point is defined within a coordinate system having an x, y, and z-axis where the axes correspond to width, height, and depth respectively. The location of a control point is defined by its x, y, and z coordinates. The control points are used to compute a polynomial that passes through the control points thereby forming a surface or curve. A complex object may be subdivided into smaller parts where each part is represented by a polygon. Transformations on an object may be performed by moving one or more control points and then regenerating the set of polygons that are used to shape the surface or line thereby producing a 3D graphics object reflecting the transformations.

A smart object 102 includes one or more control points where each control point may have a corresponding behavior and constraint. A control point represents a point on a surface or curve where a transformation may be applied to the entire object in the manner described by a behavior. A transformation may include scaling, rotation, or translation. Scaling resizes an object along any one or more axes. A rotation rotates an object along any one or more axes. A translation moves an object along any one or more axes. The behavior describes a particular transformation along one or more axes. A constraint is a limit imposed on a transformation. In some embodiments, the behavior may include executable code that may execute upon the user interacting with the control point in a prescribed manner.

A smart object 102 may be embodied in the form of a file stored in a memory, hard disk drive, and the like. The smart object file may be implemented in a programming language (e.g., C++, etc.), a markup language (e.g., XML, etc.), a scripting language (e.g., Jscript, VBScript, Perl, etc.), and the like. The behavior of the smart object 102 describes a transformation and may be implemented as executable code, data, or combination thereof.

A transformation template 103 includes instructions on how to insert additional control points to a smart object in order to apply a specific transformation. The instructions are utilized by the design surface to apply the transformations. The instructions are also used to present an icon of the transformation template to the user.

A user may utilize a transformation template to add control points to an object in order to perform the associated transformation. Examples of such transformations may be: to duplicate a section of an object; to create a bulge in an object; to twist an object; to add a section to an object; and so forth. A history stack 123 contains the user actions 116 or operations applied to a smart object which is described in more detail below.

Figure 2:
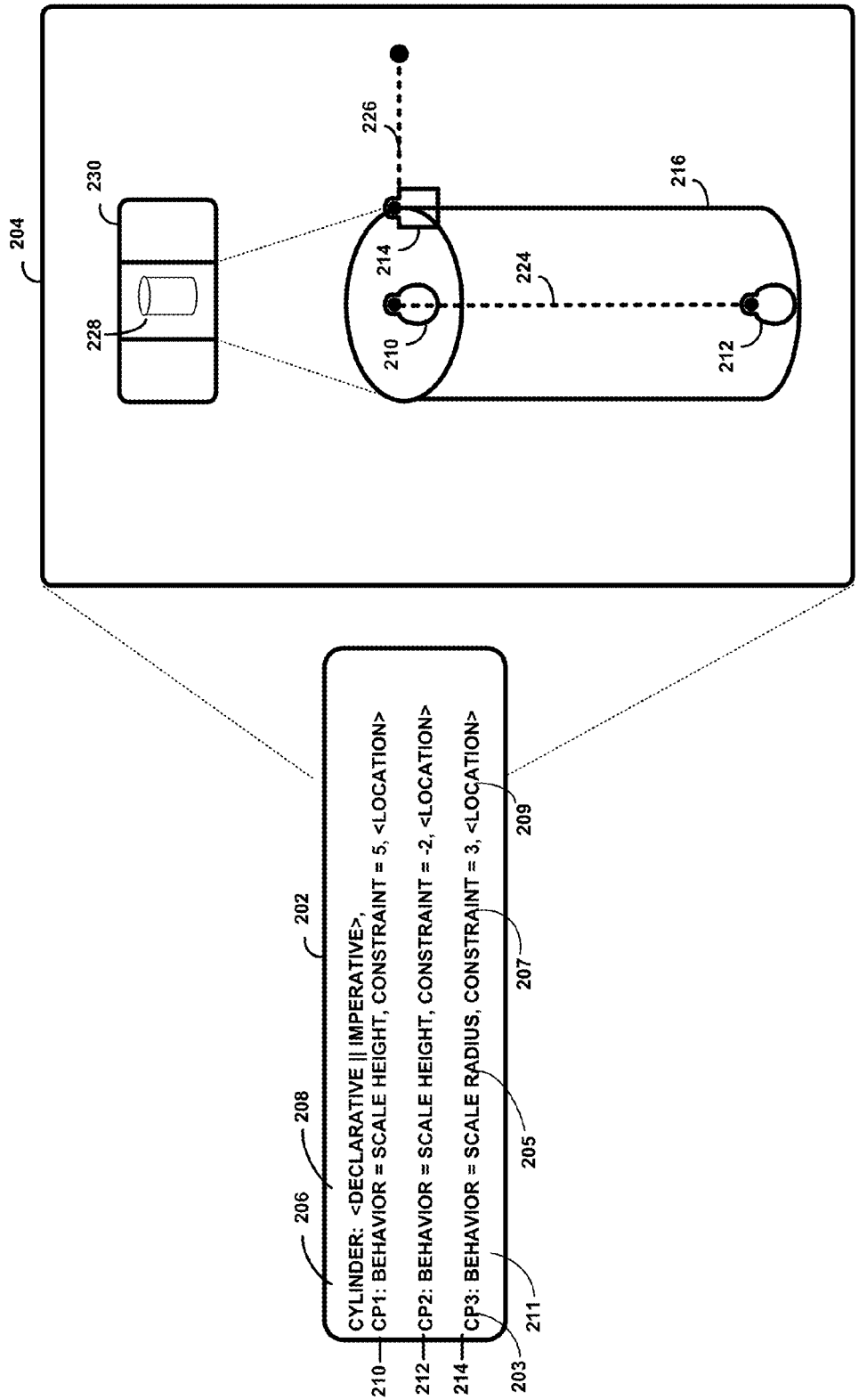
FIG. 2 illustrates an exemplary smart object file and a visual representation of a smart object.

FIG. 2 illustrates an exemplary smart object file 202 that describes the smart object 216 rendered on the display 204. The display 204 shows an icon 228 of the smart object displayed in a menu 230. When the user selects the icon 228, the smart object 216 appears on the display 204 with its control points, 210, 212, 214.

A control point may be represented by a particular shape or icon. As shown in FIG. 2, control points 210, 212 are 3D control points that are represented with a circular-shaped handle. A 3D control point is used to apply any transformation along one or more of the x, y, z axes. Control point 214 is a one dimensional control point that is represented with a square-shaped handle. A one dimensional control point performs a single transformation along a single axis.

The smart object file 202 may contain data indicating a name 206 identifying the smart object and an attribute 208 indicating whether the control points are declarative or imperative. A declarative control point declares the constraint of the transformation through a constraint value. An imperative control point contains programmable code that is invoked when the smart object is used. The programmable code controls the user's actions with regards to the control point including different actions that may occur when a user exceeds the bounds of a constraint.

Each control point may also be described using an identifier 203, a behavior 205, a constraint 207, a location 209, and a dimension 211. An identifier 203 contains a name identifying the control point, the behavior 205 indicates a type of transformation, the constraint 207 indicates a limit on the transformation in a particular unit of measure (i.e., inches, etc.), and the location 209 provides a description of the placement of the control point on the graphic object, and the dimension. The location 209 may be a reference to a memory location or file including the data used to display the control point onto the graphics object.

As shown in FIG. 2, the smart object file 202 may include three control points: CP1, 210; CP2, 212; and CP3, 214. The description for control point CP1, 210, indicates that the control point controls height (i.e., behavior=scale height), the control point scales the height by a length of at most 5 units (i.e., constraint=5). The description for control point CP2, 212, indicates that the control point controls height (i.e., behavior=scale height) and that the control point shortens the height by at most a length of 2 units (i.e., constraint=−2). The description for control point CP3, 214, indicates that the control point controls the radius (i.e., behavior=scale radius) and that the control point scales the radius by a length of at most 3 units (i.e., constraint=3).

Display 204 shows a cylinder 216 having three control points that were described in the smart object file 202. The dotted lines 224, 226 may be displayed to show the direction along which a control point may be moved. For instance, dotted line 224 shows the vertical movement of control points 210, 212 and dotted line 226 shows the horizontal direction along which a user may move control point 214, along the x-axis.

Turning back to FIG. 1, a user may interact with a smart object 102 through any one or more input/output (I/O) devices 112, such as a microphone 112A, keyboard 112B, mouse 112C, joy stick 112D, and so forth. A touch screen display 108 may be used that has the capability to recognize and process touches and gestures made to a touch screen embedded in the display 108. A user may interact with the touch screen display 108 through a pen, a pointing device, the user's finger, and so forth. Although, the embodiments are described with respect to a touch screen display, the embodiments are not limited in this manner. User input may be captured from other input devices, such as a keyboard, joy stick, and so forth.

The user's input is captured by the direct manipulation user interface 120. The direct manipulation user interface 120 may include a precision control module 122, a history stack module 124, a control module 125, and a toolbox 126.

Regardless of the manner in which the user's input is applied through the input devices, the user's input is received by a control module 125 that processes the input into executable instructions or user actions 116 that are transmitted to the design surface 106. The control module 125 may interact with the precision control module 122 to enable a user to specify precision control for a transformation. In addition, the control module 125 may interact with a history stack module 124 to track operations that are made at various stages of the design process and to undo operations in order to return to a previous stage. The toolbox 126 may include tools, toolbars, menus, icons, etc. that a user may use to create and manipulate 3D graphic objects.

The design surface 106 generates geometric models for the 3D graphic objects that are encompassed in a scene. The design surface 106 receives data describing a smart object, such as the smart object file 102 and transformation templates 103, and forms a 3D geometric model from the data. The design surface 106 interacts with the 3D runtime engine 104 to convert the 3D geometric models into a digital image that is used by a graphics subsystem 110 to render the 3D graphic object in a scene onto the display 108.

The graphics subsystem 110 renders the digital images onto the display 108. The graphics subsystem 110 may contain one or more graphics processing units (GPU) and a graphics memory dedicated to performing the rendering process.

In one or more embodiments, the application 118 may be a graphics software application, a 3D modeling application, a computer-aided design (CAD) tool, an integrated development environment (IDE) 118, a 3D printing application, a graphics application for a 3D printer, a 3D gaming application, or any combination thereof. In other embodiments, one or more components of application 118 may be embedded into other software applications, such as an operating system, web browser, and so forth. In one or more embodiments, the application may be Microsoft's Visual Studio® IDE.

In one or more embodiments, the 3D runtime engine 104, design surface 106, direct manipulation user interface 120, and application 118 may be a sequence of computer program instructions, that when executed by a processor, causes the processor to perform methods and/or operations in accordance with a prescribed task. The 3D runtime engine 104, design surface 106, direct manipulation user interface 120, and application 118 may be implemented as program code, programs, procedures, module, code segments, program stacks, middleware, firmware, methods, routines, and so on. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

In various embodiments, the system 100 described herein may comprise a computer-implemented system having multiple elements, programs, procedures, modules, such as without limitation, a mobile device, a personal digital assistant, a mobile computing device, a smart phone, a cellular telephone, a handheld computer, a server, a server array or server farm, a web server, a network server, an Internet server, tablet, a work station, a mini-computer, a mainframe computer, a supercomputer, a network appliance, a web appliance, a distributed computing system, multiprocessor systems, or combination thereof. The elements of the system may be implemented in hardware, a combination of hardware and software, or software. For example, an element may be implemented as a process running on a processor, a hard disk drive, multiple storage drives (of optical and/or magnetic storage medium), an object, an executable, a thread of execution, a program, and/or a computer. One or more elements may reside within a process and/or thread of execution, and an element may be localized on one computer and/or distributed between two or more computers as desired for a given implementation. The embodiments are not limited in this manner.

Figure 3A:
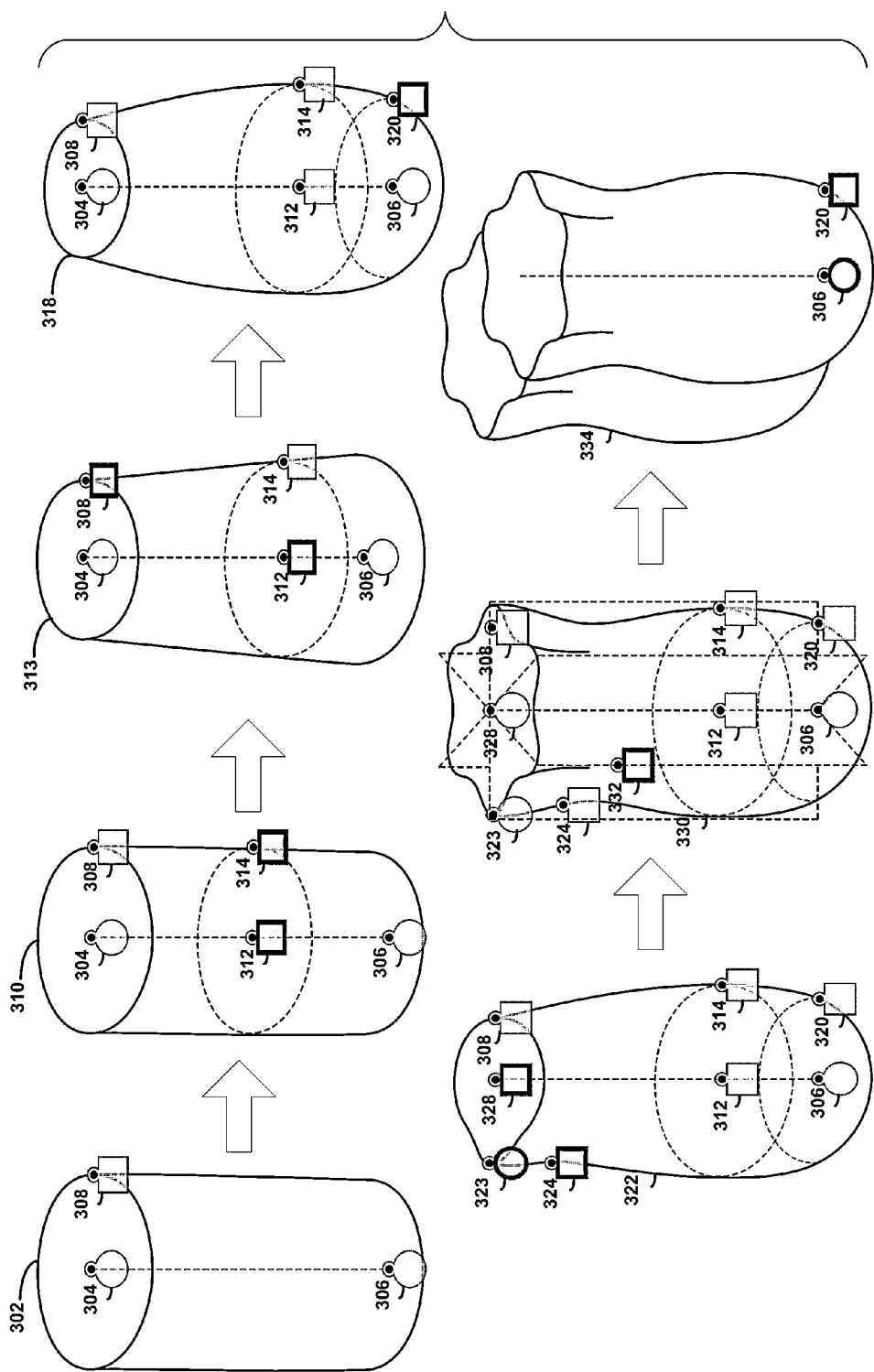
FIGS. 3A-3B are exemplary illustrations showing the use of the direct manipulation user interface.
Figure 3B:
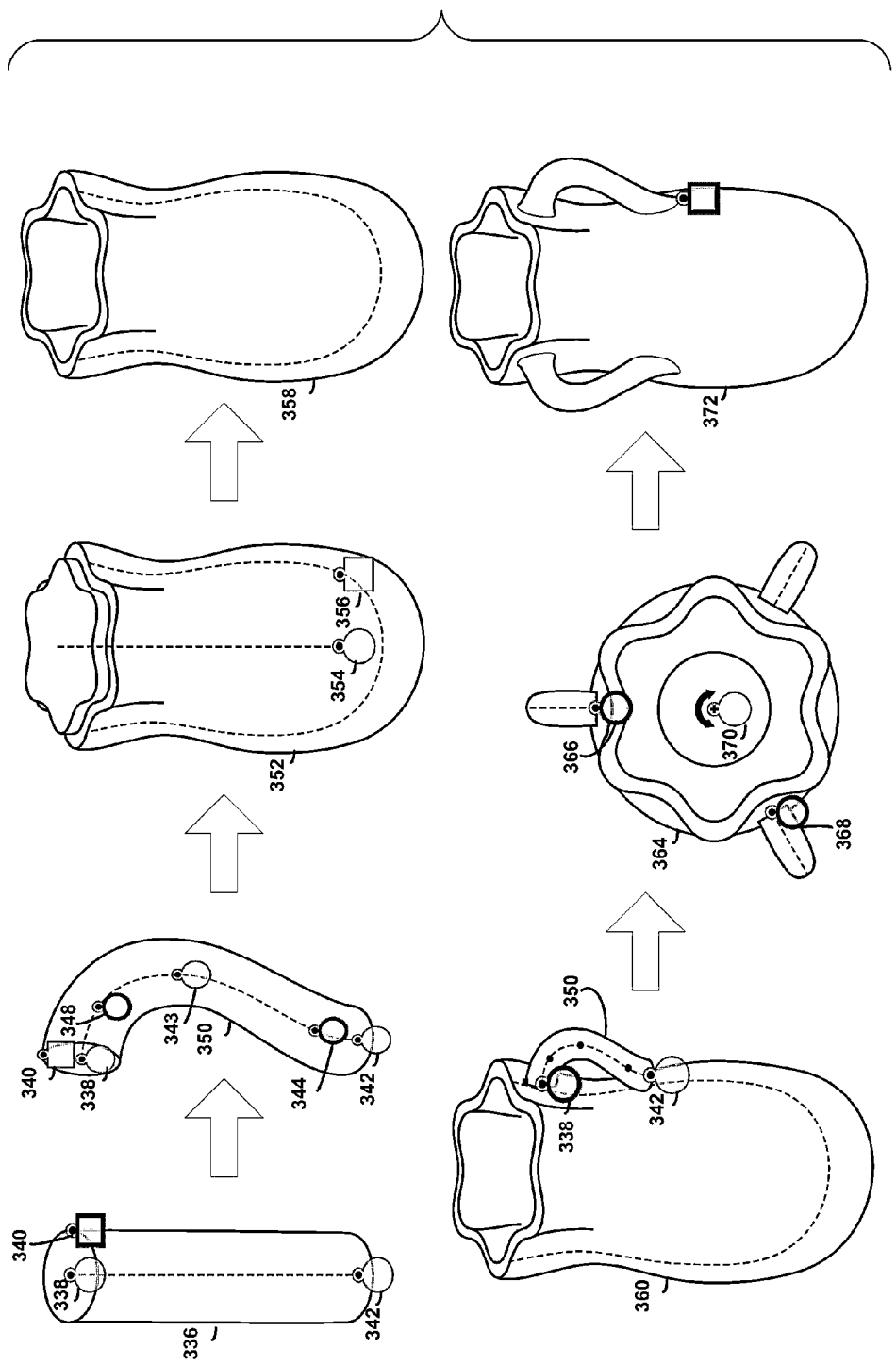
Figure 4A:
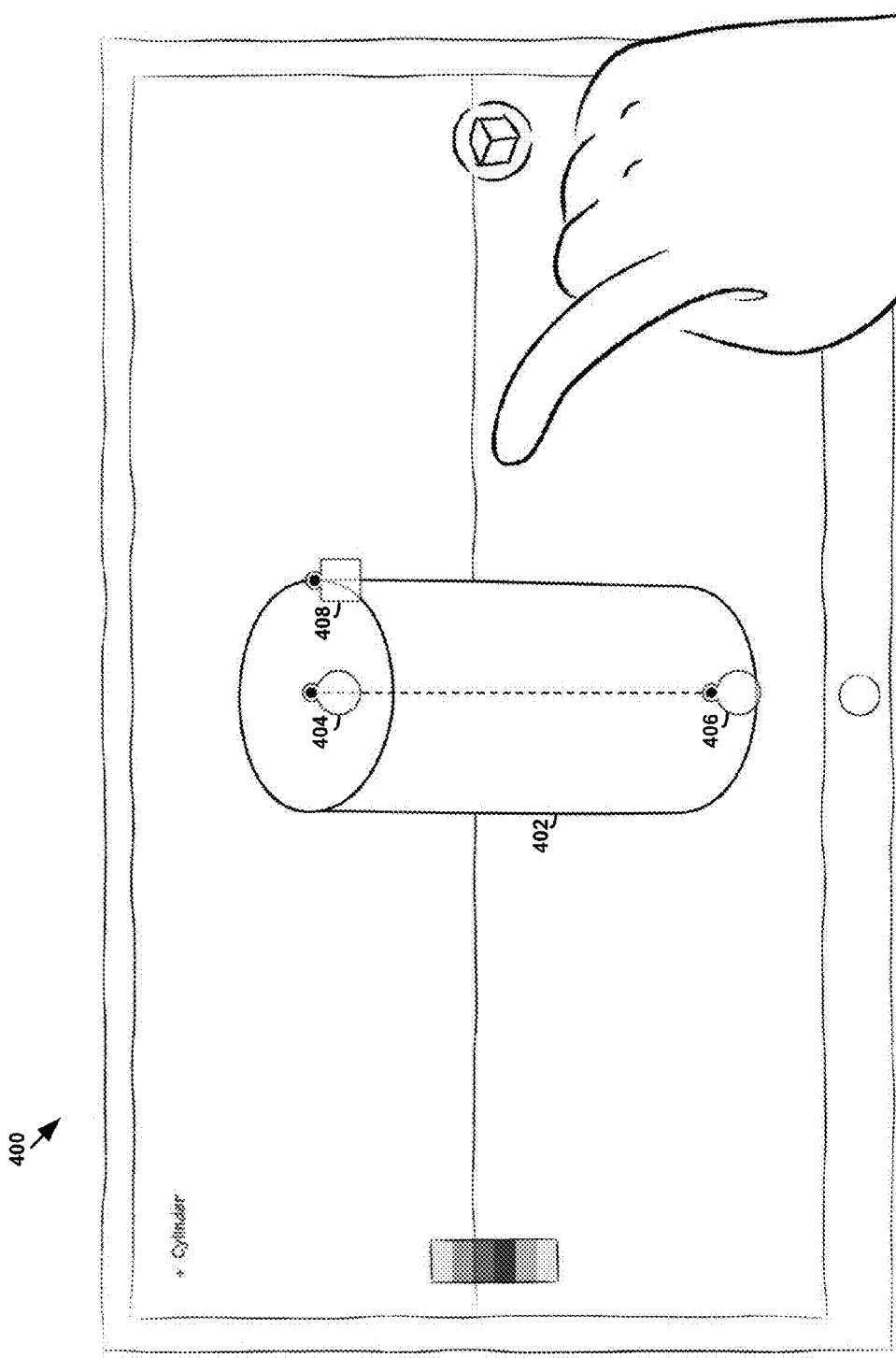
Figure 4B:
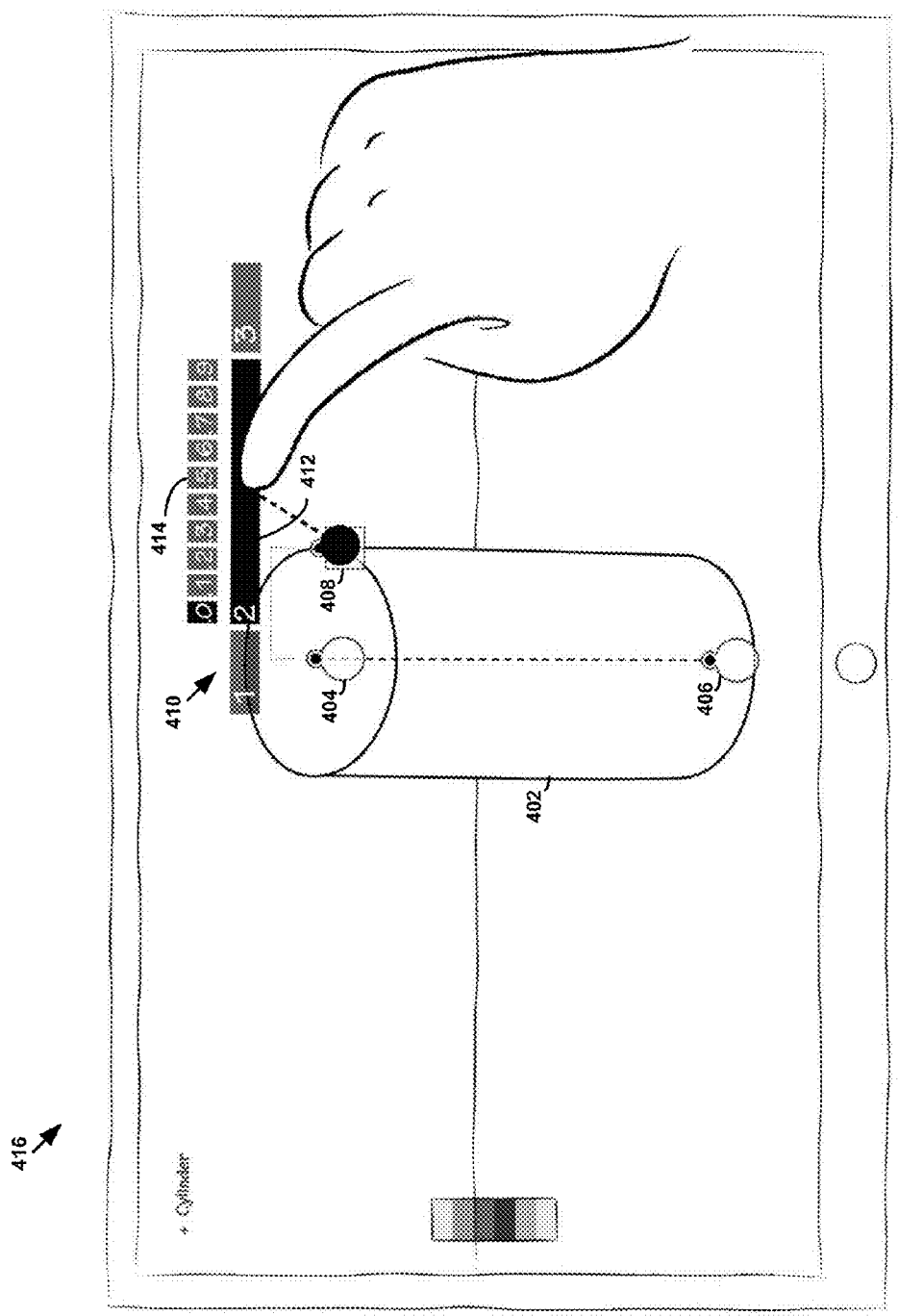

Attention now turns to exemplary illustrations showing the use of the direct manipulation user interface to create a 3D graphic object using smart objects. FIGS. 3A-3B illustrate the use of the direct manipulation user interface to generate a complex image such as a Grecian vase from a cylinder-shaped smart object. FIGS. 3A-3B show the utility of the direct manipulation user interface for a user with limited expertise in 3D graphics modeling or unfamiliarity with the nuances of a graphics application. FIGS. 4A-4C illustrate a precision control mechanism that provides a user with precision control over a transformation. FIGS. 5, 6A-6C illustrate the use of a history stack to undo and/or redo operations performed on the control points during a design process.

FIGS. 3A and 3B illustrate the use of self-disclosing control points in the direct manipulation user interface that may be manipulated by a user to create a Grecian vase from a smart object. Turning to FIG. 3A, a user may import smart object 302 shaped as a cylinder and having control points 304, 306, and 308. A middle section may be added to the cylinder using a transformation template which results in cylinder 310. The newly added middle section is controlled by control points 312, 314. Control points 312, 314 may be used to enlarge the middle section of the cylinder thereby generating cylinder 313. A bottom section may be added to the cylinder as shown in cylinder 318. Control point 320 may be used to control the newly added bottom section.

A bulge transform may be added to the top of the cylinder thereby producing object 322. The bulge is defined by control points 324, 326, 328. Next, a symmetry transform is applied to the object 323 so that both sides of the object are identical which results in object 330. Control point 332 controls a dimension of the symmetry. A duplicate transform is applied to object 330 resulting in an identical object appended to object 330 which is shown as object 334.

FIG. 3B shows the continued application of additional transformations to the smart object created in FIG. 3A. FIG. 3B illustrations transformations that create three handles which are then attached to the smart object created in FIG. 3A. A smart object 336 configured as a cylinder is imported and has control points 338, 340, 342. A transformation template is used to add control points on the spine of smart object 336 in order to shape the smart object 350 into a handle. The spine is configured into a handle by manipulating control points 344, 343, 348.

A move and scale transform is applied to smart object 334, shown in FIG. 3A, resulting in smart object 352. Smart object 352 includes two duplicate objects. One of the duplicate objects has control points 354, 356 which are used to apply a subtraction transform to eliminate duplicate segments resulting in smart object 358. A move and scale transform is applied to the handle 350 so that the handle is attached to smart object 360 using control points 338, 342. The resulting smart object 364 is rotated using control point 370. A duplicate transformation is applied so that the additional handles are made and attached at control points 366, 368 resulting in the Grecian urn or smart object 372.

It should be noted that although FIGS. 3A-3B illustrate specific transformations made to a smart object, the techniques described herein may also be applied to a 3D mesh. The direct manipulation user interface may be utilized to apply transformations through self-disclosing control points to graphic images configured as a mesh. A mesh is a set of vertices, edges, and polygons that represent a 3D object that may have been created previously.

Attention now turns to a discussion of the precision control mechanism of the direct manipulation user interface. In some instances, a user may need to specify an exact dimension, tolerance, and/or position to create and/or modify a 3D graphic image. The precision control module is utilized to provide additional dimensions, tolerances, or positions to a transformation.

Referring to FIG. 4A, there is shown a direct manipulation user interface 400 having a smart object 402 configured as a cylinder. The smart object 402 has two 3D control points 404, 406 and a one-dimensional (1D) control point 408. Control point 408 may be used to scale the cylinder's radius. In the event, the user extends the radius beyond the control point's constraint value, the radius is extended to the limit specified by the control point's constraint value.

As shown in FIG. 4B, the direct manipulation user interface 416 shows that as a user touches the 1D control point 408, a first menu bar 410 appears. The first menu bar 410 contains a label for each unit of measurement within the control point's constraints. As shown in FIG. 4B, the menu bar 410 contains a label for each measurement value. As the user touches the label 412 associated with the measurement value of "2", a second menu bar 414 appears which has labels for a second unit of measurement. The second unit of measurement is a subunit of the first dimension. For instance, if the first menu bar 410 displays measurements in inches, the second menu bar 414 may be in tenths of an inch. As shown in FIG. 4C, the user used control point 408 to scale the radius of cylinder 402 by 2.1 measurement units which is shown in label 420.

Figure 4D:
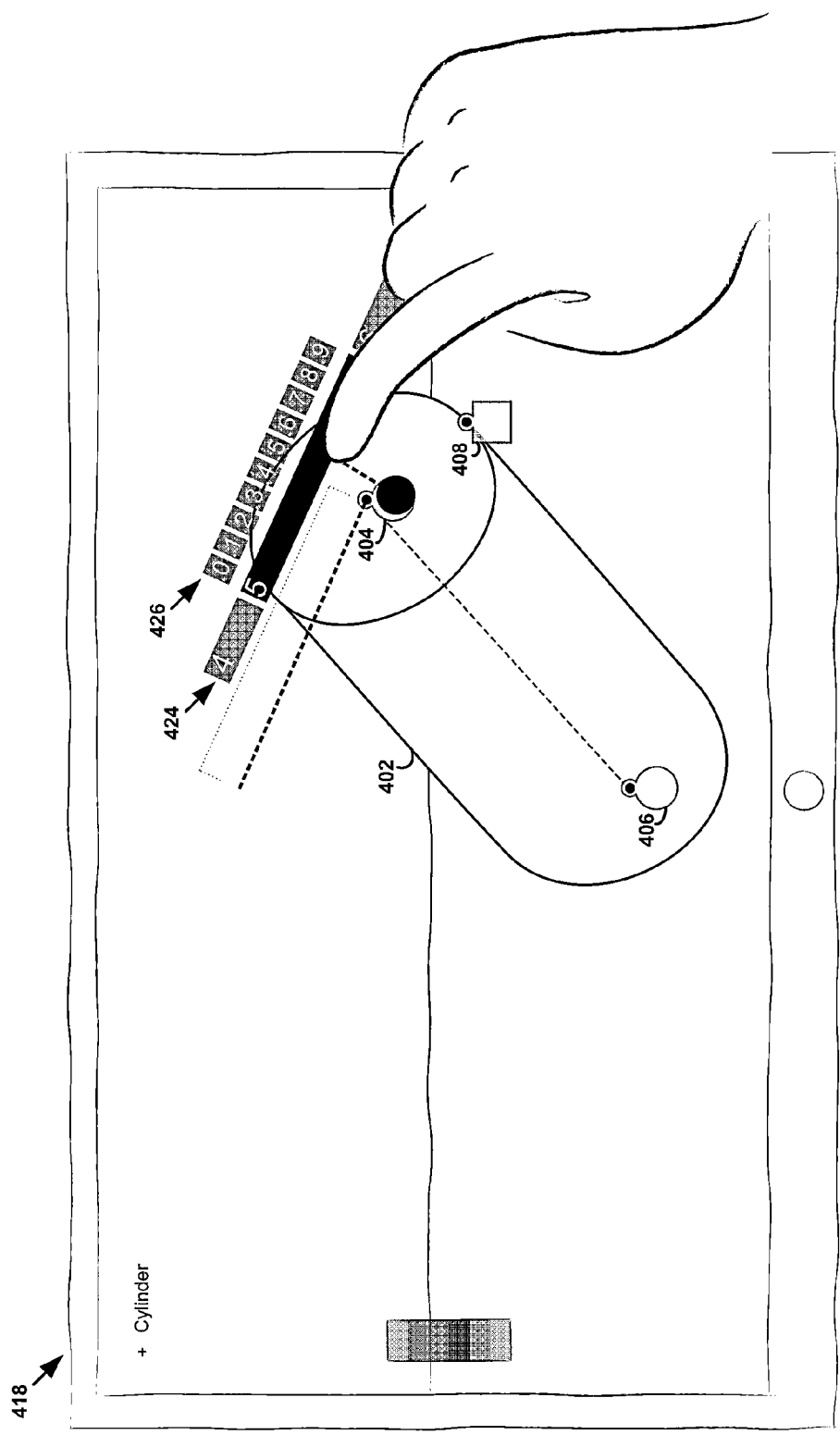

FIG. 4D illustrates a direct manipulation user interface 418 where precision control is applied to rotate the cylinder along the y-axis. FIG. 4D shows cylinder 402 with 3D control points 404, 406 and 1D control point 408. Control point 404 may be utilized to rotate the cylinder along the y-axis. As the user touches control point 404, a first menu bar 424 appears with a first set of measurement values within the constraints associated with control point 404. When the user touches a measurement value in the first menu bar 424, a second menu bar 426 appears which contains subunits of the first measurement value. The user may select one of the subunits and the transformation is applied using that measurement value.

Although FIGS. 4A-4D illustrate the use of precision control for transformations, it should be noted that the same techniques may be applied to uses, such as without limitation, positioning a smart object. Additionally, the precision control techniques may be applied to components of a smart object, such as an ellipse, vertices, surface, etc., to transform the components with finer precision control. The embodiments are not limited in this manner.

Attention now turns to a more detailed discussion of the history stack. The history stack preserves the operations used in each stage of the design surface. When the user needs to undo one or more transformations, the user may activate the undo option. The undo option displays a window showing a rendered surface along with a history bar. The user may utilize the history bar to scroll through each stage in a forward or backwards direction to view the previous stages of the design surface. The user may select a particular previous stage to which to return to and the history stack module is used to generate that rendered stage onto the display.

Figure 5:
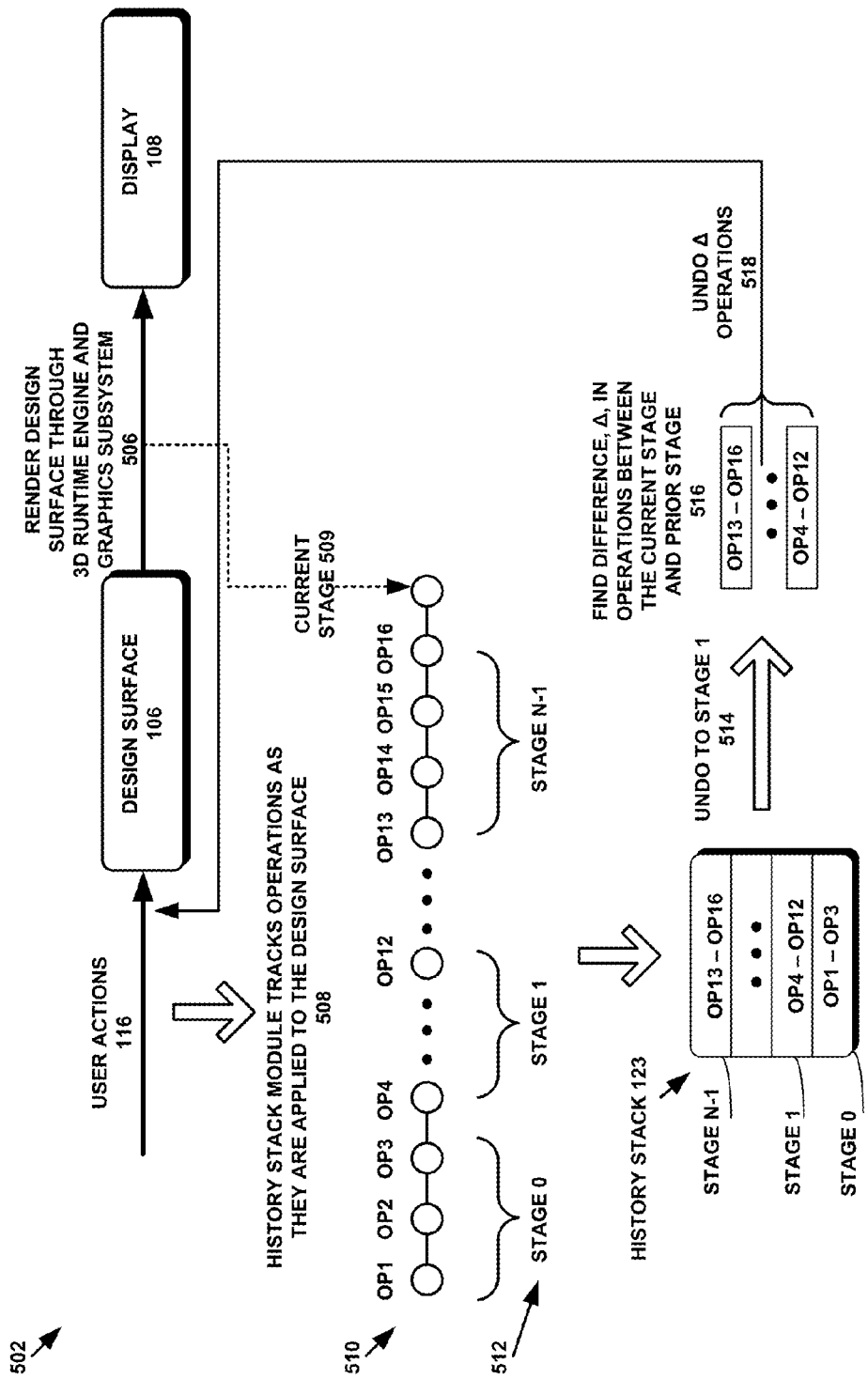
FIG. 5 is a block diagram illustrating the process of tracking operations applied at each stage and the history stack to undo operations.

Turning to FIG. 5, the user's manipulations with the control points are processed by the control module and converted into executable instructions or operations, referred to as user actions 116, which are used by the design surface 106 (block 502). The design surface 106 is rendered onto the display 108 through the 3D runtime engine and the graphics subsystem (block 502). A stage is a configuration of the design surface. A stage contains all the operations used to apply the transformations made during a particular time period. A stage may be the transformations applied within a day, an hour, a week, and so forth. The time period may be a user-configurable variable or set by the application.

The history stack module 124 keeps track of the operations that are applied to the design surface 106 at each stage (block 508). FIG. 5 shows three stages 512, Stage 0, Stage 1, and Stage N−1, and the operations 510 applied at each stage. Stage 0 consists of operations OP1-OP3, stage 1 consists of operations OP4-OP12, and stage N−1 consists of operations OP13-OP16.

Each stage and its associated operations may be stored in a history stack 123. The history stack 123 may be configured as a data structure that operates in a first-in-last-out order. The operations applied at the earliest stage are stored in the bottom of the stack and the operations applied to the current stage 509 are stored at the top of the stack. When a user requests to return to a previous stage (block 514), the operations that were applied up to the requested stage are popped off the history stack 123 and analyzed (block 516). The history stack module 124 determines the difference between the operations that were applied in the current stage from the operations applied at the requested stage (block 516) and these operations are deleted from the design surface (block 518).

Figure 6A:
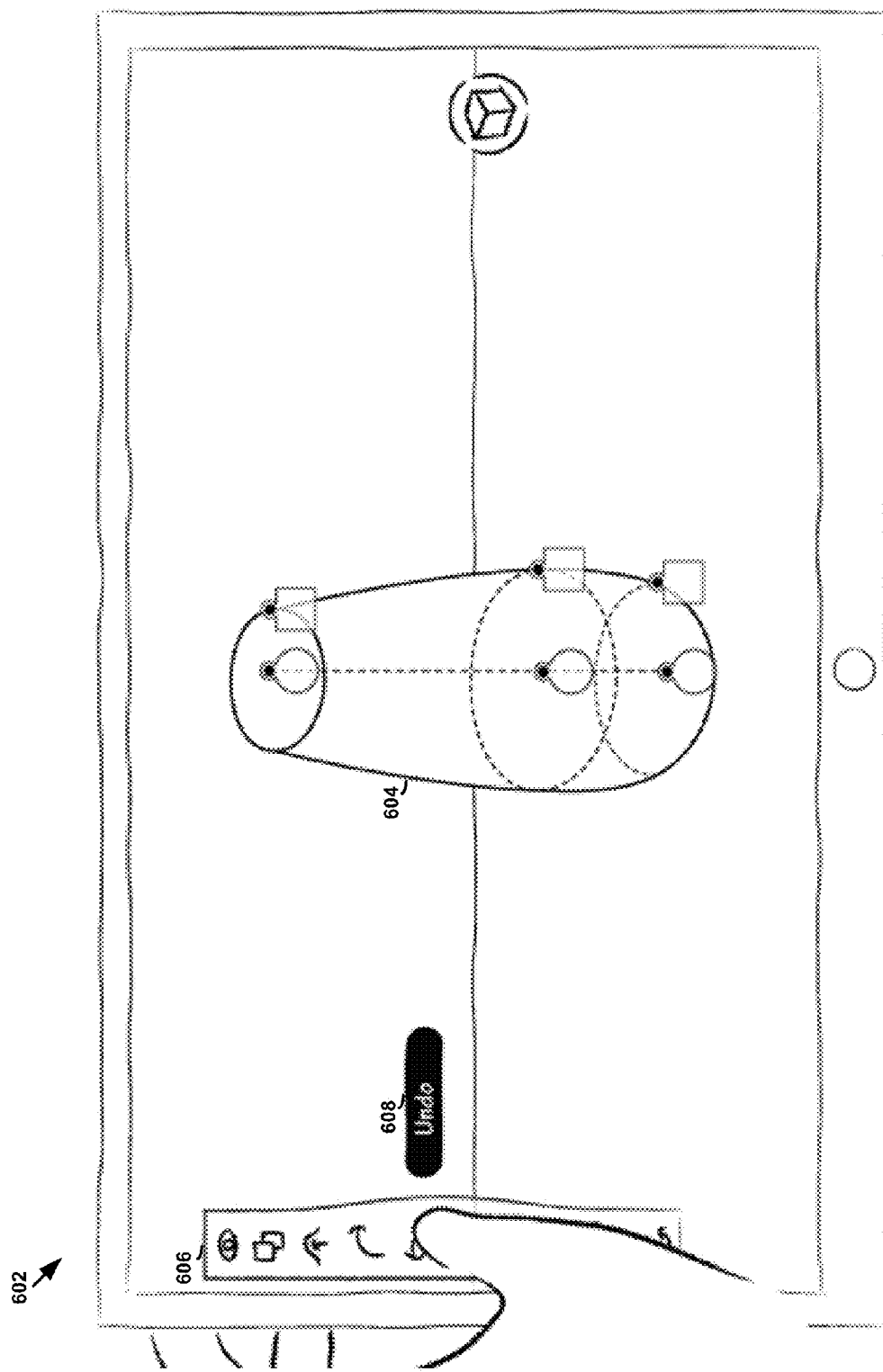
FIGS. 6A-6C are exemplary illustrations showing the use of the history bar.
Figure 6B:
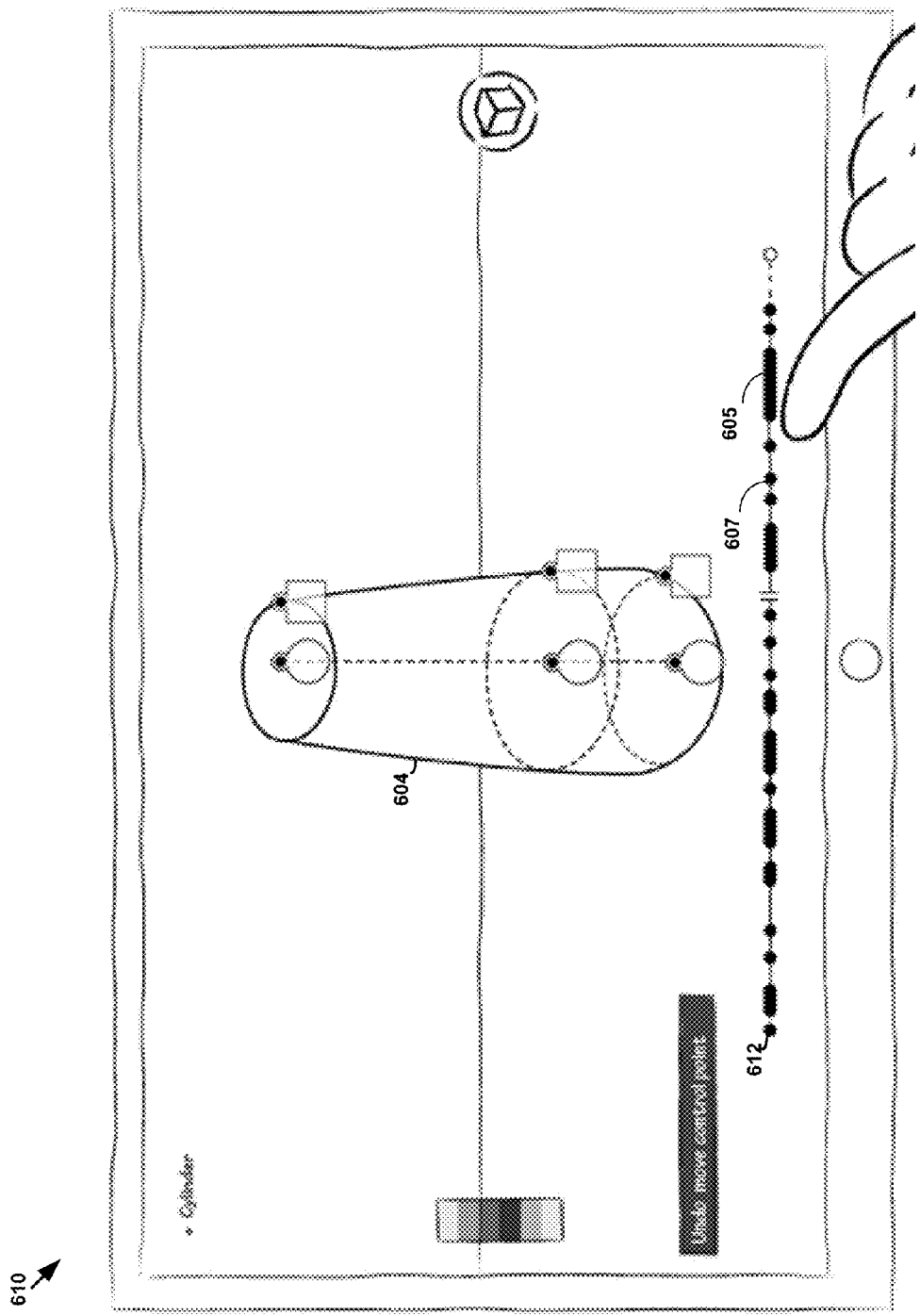
Figure 6C:
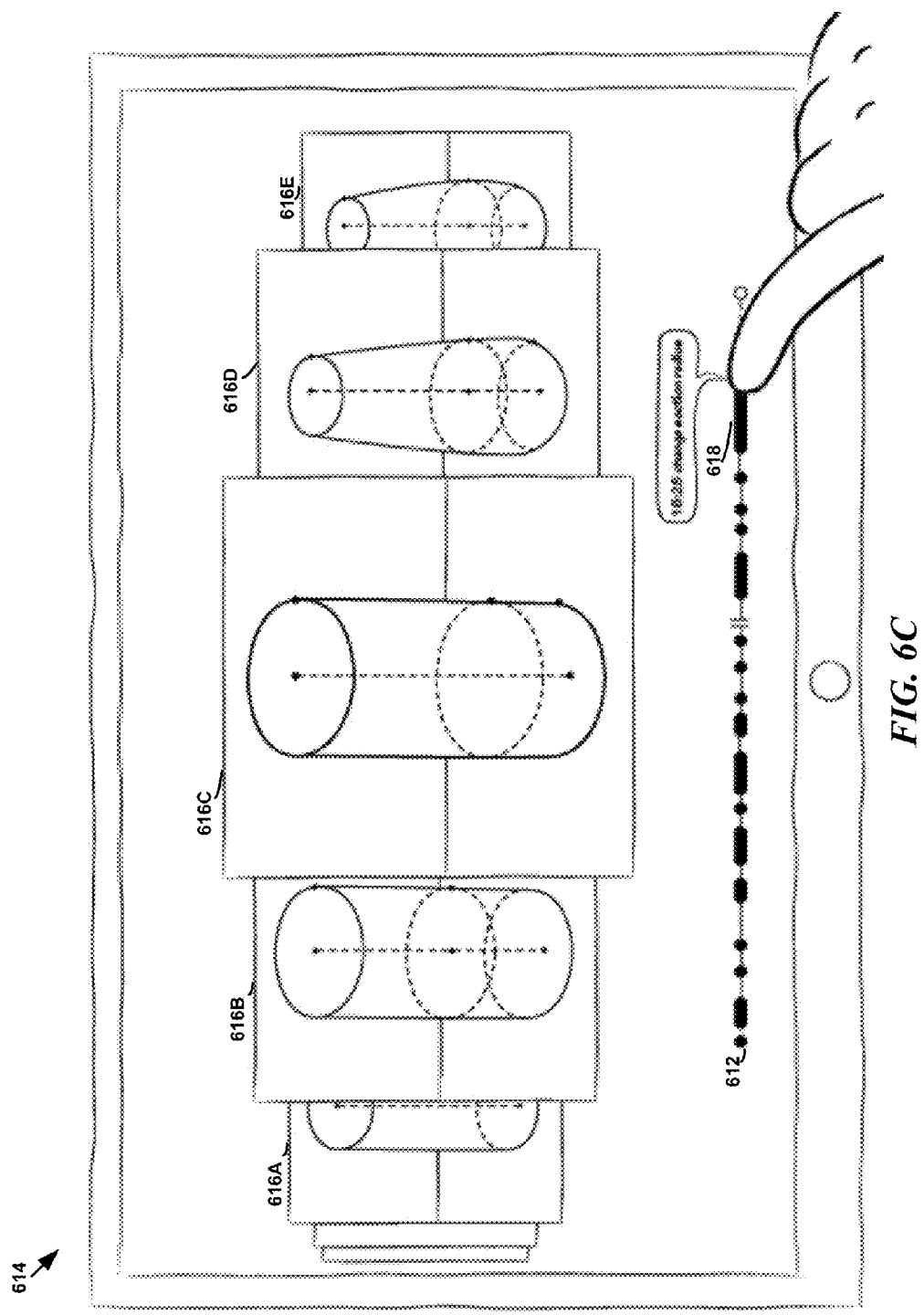

FIGS. 6A-6C illustrate an exemplary application of the history stack mechanism. Turning to FIG. 6A, there is shown a direct manipulation user interface 602 having a cylinder-shaped smart object 604 with multiple control points. The direct manipulation user interface 602 contains a menu bar 606 having an undo option 608. The user may activate the history stack by touching the undo option 608 in the menu bar 606.

Referring to FIG. 6B, there is shown a direct manipulation user interface 610 having the smart object 604 displayed. A history bar 612 is displayed below the smart object 604. The history bar 612 may include circular-shaped components that represent different time periods. The larger circular-shaped component represents a longer time period than the smaller circular-shaped component. For example, as shown in FIG. 6B, component 605 represents a time period that is longer than the time period represented by component 607.

FIG. 6C illustrates a direct manipulation user interface 614 showing the result of activating the history bar 612. As shown in FIG. 6C, when the user touches component 618 of the history bar 612, the transformations, 616A-616E, applied during the time period associated with component 618 are displayed. In FIG. 6C, component 618 relates to the transformations that transformed the radius. The user may select one of these transformations, 616A-616E, by touching the window displaying the transformation.

Attention now turns to a description of embodiments of exemplary methods of the direct manipulation user interface. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. The methods can be implemented using one or more hardware elements and/or software elements of the described embodiments or alternative embodiments as desired for a given set of design and performance constraints. For example, the methods may be implemented as logic (e.g., computer program instructions) for execution by a logic device (e.g., a general-purpose or specific-purpose computer).

Figure 7:
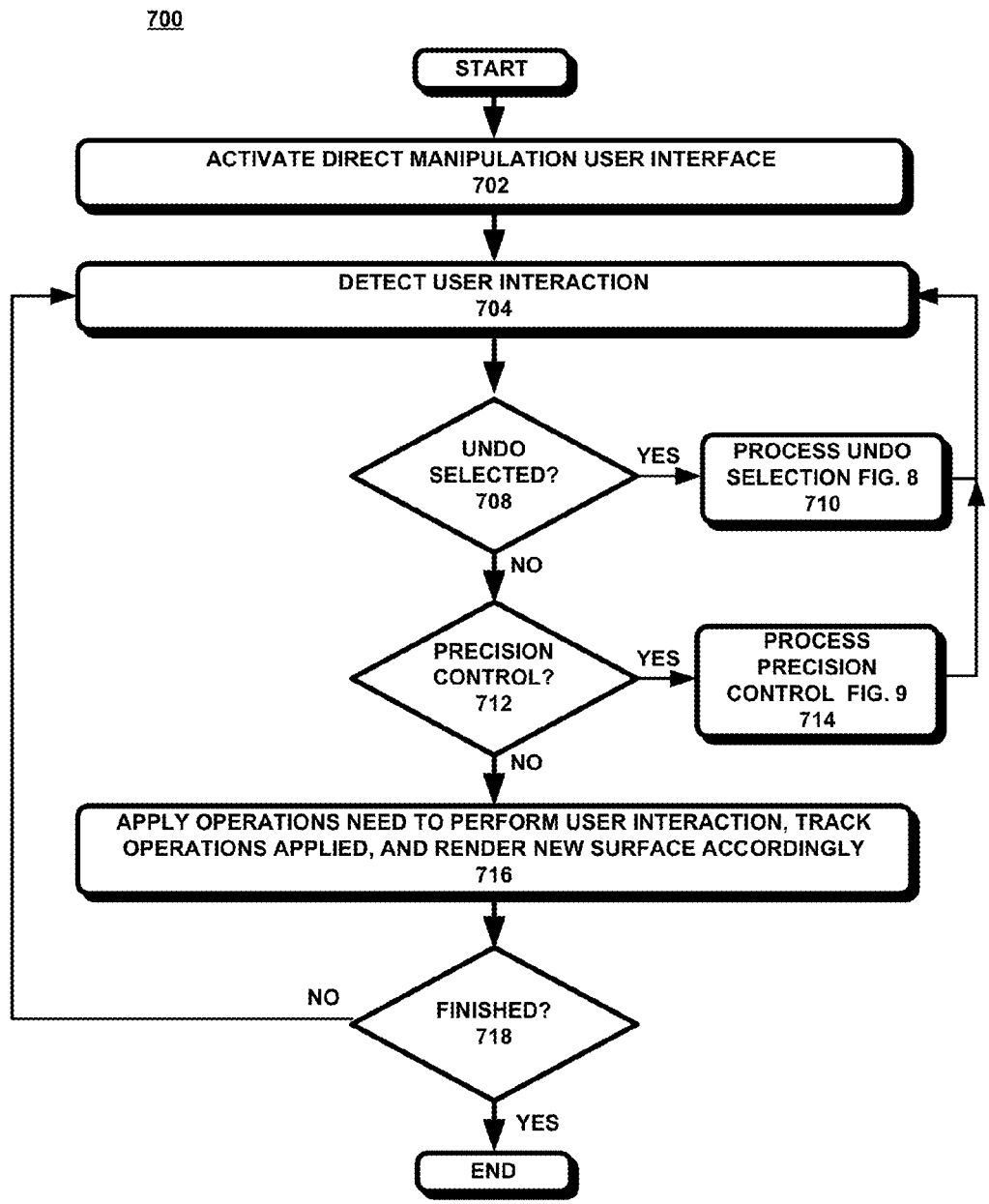
FIG. 7 is a flow diagram illustrating a first exemplary method.

FIG. 7 illustrates a flow diagram of an exemplary method 700. It should be noted that the method 700 may be representative of some or all of the operations executed by one or more embodiments described herein and that the method can include more or less operations than that which is described in FIG. 7.

Initially, the direct manipulation user interface 120 is activated (block 702). The direct manipulation user interface 120 may be launched when the application 118 is activated (block 702). The direct manipulation user interface 120 detects a user interaction or input (block 704). If the user interaction is to select the undo option (block 708—yes), then the history stack module 124 processes the undo selection (block 710). If the user interaction is to perform precision control (block 708—no, block 712—yes), then the precision control module 122 processes the user's input (block 714). Otherwise (block 712—no), the control module 125 applies the operations needed to process the user interaction and to re-render the design surface 106 accordingly (block 716). The history stack module 124 records the operations applied to the design surface 106 at this stage (block 716). The process repeats (blocks 704-716, block 718—no)) until finished (block 718—yes).

Figure 8:
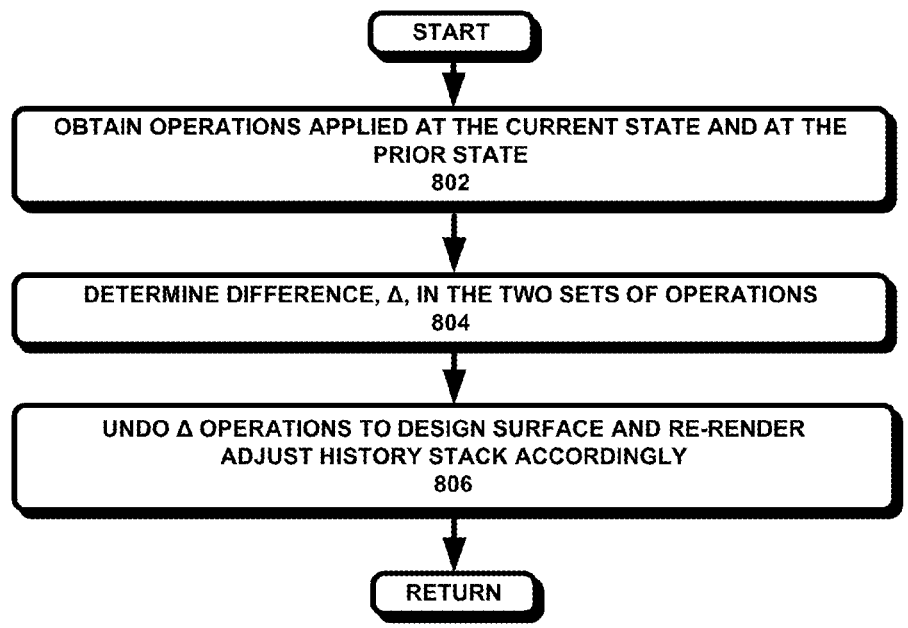
FIG. 8 is a flow diagram illustrating a second exemplary method.

FIG. 8 illustrates an exemplary method for processing the undo option. The history stack module 124 uses the history stack 123 to determine the operations applied at the current stage and the operations associated with the requested prior stage (block 802). The operations that are different from the two sets is formulated as the delta A set (block 804) and the operations in the delta set are eliminated from the design surface 106 (block 806). The design surface 106 is re-rendered and the operations applied to the design surface 106 are added to the history stack 123 (block 806).

Figure 9:
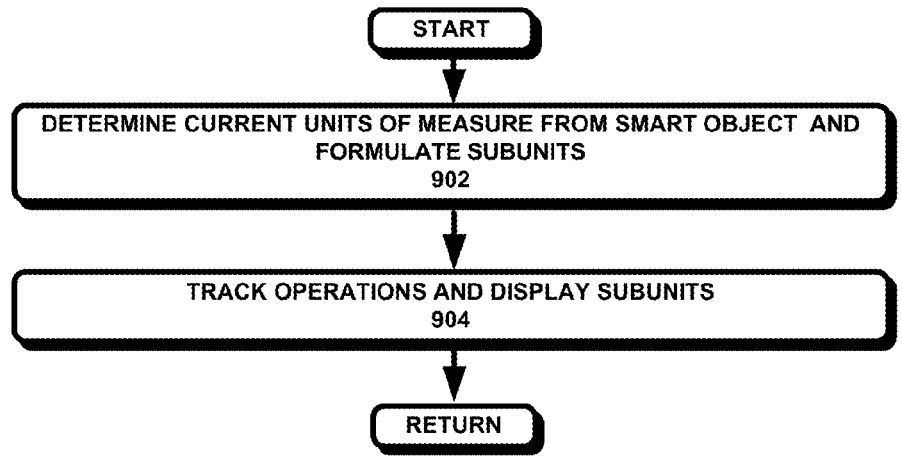
FIG. 9 is a flow diagram illustrating a third exemplary method.

FIG. 9 illustrates an exemplary method for processing the precision control mechanism. The precision control module 122 determines the current unit of measurement that is displayed with a control point (block 902). The precision control module 122 associates a subunit measurement for the current unit of measurement (block 902). The subunit measurement may be specified in the smart object file associated with the control point, specified as a user option, or otherwise (block 902). Additionally, the precision control module 122 may track the current measurement unit displayed with the control point. The precision control module 122 displays the subunit measurement in an additional menu bar (block 904).

Figure 10:
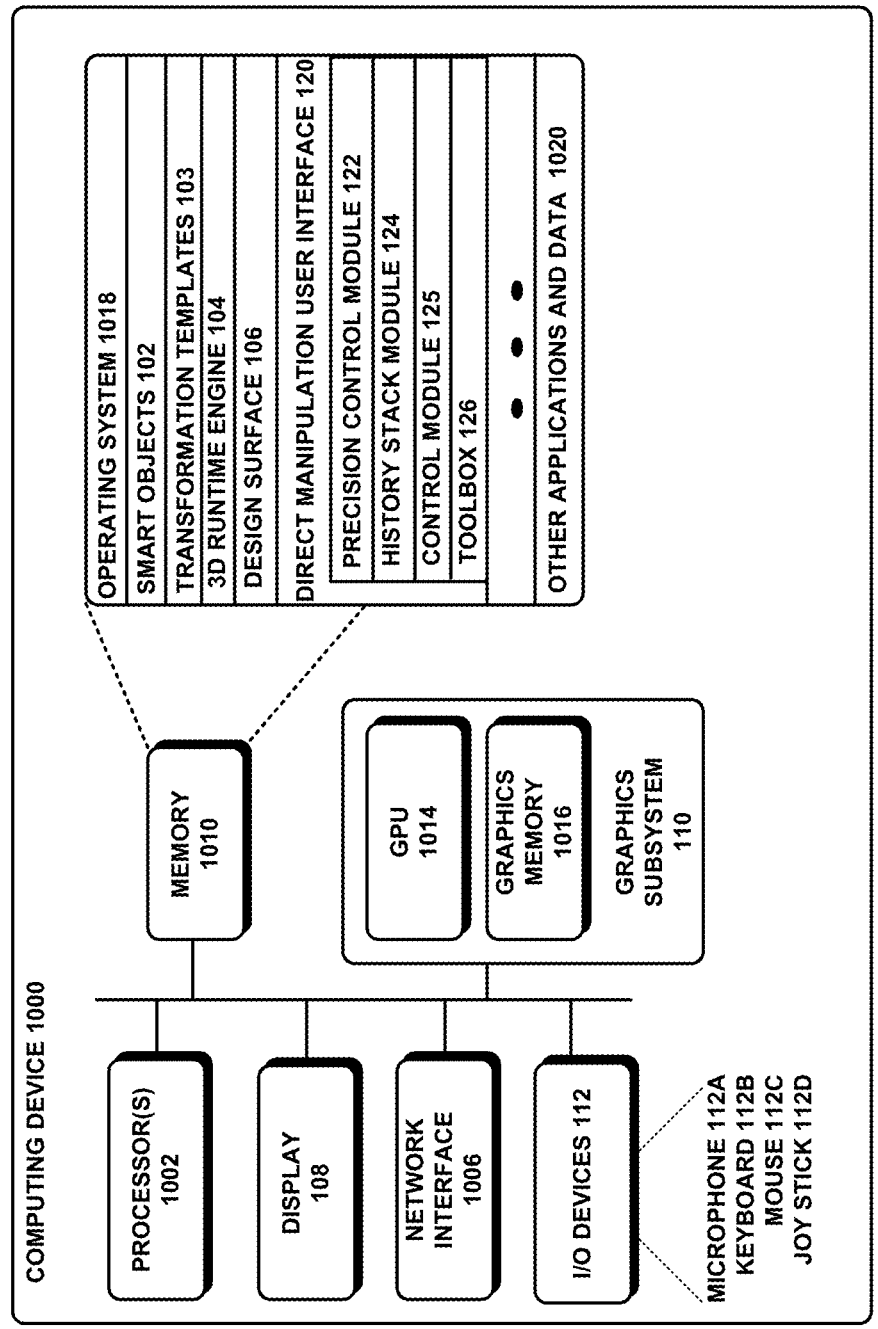
FIG. 10 is a block diagram illustrating an exemplary operating environment.

Attention now turns to a discussion of an exemplary operating environment. Referring now to FIG. 10, there is shown a schematic block diagram of an exemplary operating environment 1000. It should be noted that the operating environment 1000 is exemplary and is not intended to suggest any limitation as to the functionality of the embodiments.

The operating environment may be configured as a computing device 1000. The computing device may be any type of electronic device capable of executing programmable instructions, such as without limitation, a mobile device, a personal digital assistant, a mobile computing device, a smart phone, a cellular telephone, a handheld computer, a tablet, a server, a server array or server farm, a web server, a network server, an Internet server, a work station, a mini-computer, a mainframe computer, a supercomputer, a network appliance, a web appliance, a distributed computing system, multiprocessor systems, or combination thereof.

The computing device 1000 may have one or more processors 1002, a display 108, a network interface 1006, one or more input/output (I/O) devices 112, a memory 1010, and a graphics subsystem 110. A processor 1002 may be any commercially available processor and may include dual microprocessors and multi-processor architectures. The display 108 may be any visual display unit and it may be embedded within a computing device or physically separated from it. The network interface 1006 facilitates wired or wireless communications between the computing device 1000 and a communications framework. The graphics subsystem 110 is a specialized computing unit for rendering graphics images. The graphics subsystem 110 may be implemented as a graphics card, specialized graphics circuitry, and the like. The graphics subsystem 110 may include a graphics processing unit (GPU) 1014 and a graphics memory 1016.

The memory 1010 may be any computer-readable storage media that may store executable procedures, applications, and data. The memory 1010 may be implemented as a computer-readable storage device. The memory 1010 may be any type of memory device (e.g., random access memory, read-only memory, etc.), magnetic storage, volatile storage, non-volatile storage, optical storage, DVD, CD, floppy disk drive, flash drive, and the like. The computer-readable storage media does not pertain to propagated signals, such as modulated data signals transmitted through a carrier wave. The memory 1010 may also include one or more external storage devices or remotely located storage devices. The memory 1010 may contain instructions and data as follows:

an operating system 1018;
one or more smart objects 102;
one or more transformation templates 103;
a 3D runtime engine 104;
a design surface 106;
a direct manipulation user interface 120 including a precision control module 122, a history stack module 124, a control module 125, and a toolbox 126; and
various other applications and data 1020.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The techniques described herein may be applied through voice activated commands. The direct user manipulation interface may be activated in a voice input mode. The direct user manipulation interface may include a voice recognition module that recognizes voice commands tailored to perform the user interactions discussed herein. The voice commands may be received by a microphone. When in voice input mode, the direct user manipulation interface may display labels for each control point. A user may speak a voice command referencing one or more labels to perform a user interaction. For example, to perform a precision control user interaction, a user may speak the phrase "show all measurement values for SpineStart", where SpineStart is a label associated with a control point. In response to this voice-activated command, the direct user manipulation interface displays a first measurement menu. Likewise, a user may speak the phrase "show all subunit measurement values for the value 2 of SpineStart" and the direct user manipulation interface displays the subunit measurement values for the value 2 of the control point labeled SpineStart.

Likewise, the history bar mechanism may be activated by voice commands as well. For example, a user may speak the phrase "undo operations" and the direct user manipulation interface displays a history bar menu. The history bar menu may include labels for each stage in the design process. A user may speak the phrase "show Label X" and the direct user manipulation interface displays a window for each manipulation performed in the stage associated with Label X. Each window that is displayed may be displayed with a label. The user may verbally undo the design process to a previous stage by verbally specifying the label of the window associated with the previous stage.

It should be noted that there are numerous ways to implement the voice activated commands and that the embodiments are not limited to the configuration discussed above.

What is claimed:

1. A device, comprising:
at least one processor and a memory;
the at least one processor configured to:
enable a user to interact with a 3D graphics object displayed with a control
point automatically positioned at a pre-defined location on the 3D graphics object, the control point including a pre-defined transformation configured for application to the 3D graphics object through interaction with the control point, the control point associated with a pre-defined constraint that specifies a measurement limit to the pre-defined transformation;
upon detection of a user interacting with the control point to initiate the pre-defined transformation, automatically display a first menu bar having values of a first measurement unit within the pre-defined constraint;
upon detection of a user interacting with at least one value of the first measurement unit, automatically display a second menu bar having subunit values of the at least one value of the first measurement unit; and
apply the pre-defined transformation with values detected from the first menu bar and the second menu bar.

2. The device of claim 1, wherein the at least one processor is further configured to: track operations applied to a design surface including the 3D graphics object.

3. The device of claim 1, wherein the at least one processor is further configured to display a history bar representing one or more stages of a design surface including the 3D graphics object, at least one stage associated with operations applied to the design surface to perform a transformation initiated by a user interacting with the control point or transformation template.

4. The device of claim 3, wherein the history bar is configured to enable a user to scroll through rendered views of previous stages of the design surface.

5. The device of claim 3, wherein the history bar includes a number of components, at least one component representing one or more transformations applied during a time interval.

6. The device of claim 5, wherein a size of a component represents a length of a time interval.

7. The device of claim 3, wherein the at least one processor is further configured to detect a user interaction with the history bar that selects a previous stage and initiates rendering the previous stage onto a display.

8. The device of claim 7, wherein the at least one processor is further configured to determine one or more operations needed to apply to the design surface to produce the previous stage from the tracked operations.

9. A method for implementing a direct manipulation user interface, comprising:
displaying a smart object having one or more automatically-generated control points positioned at pre-defined locations on the smart object, the smart object representing a 3D graphics object, the one or more automatically-generated control points used to implement at least one pre-defined transformation to the 3D graphics object, the one or more automatically-generated control points associated with at least one value used to perform the at least one pre-defined transformation;
displaying a first menu bar, the first menu bar displaying the at least one value within the constraint of a first control point, the at least one value associated with a first unit of measurement; and
displaying a second menu bar, the second menu bar displaying a second set of values, the second set of values being subunits of the first unit of measurement.

10. The method of claim 9, wherein the first menu bar is displayed upon a user interaction with the control point.

11. The method of claim 10, wherein the second menu bar is displayed upon a user interaction with the first menu bar.

12. The method of claim 9, further comprising:
applying the at least one pre-configured transformation on the smart object using a measurement composed of a first value from the first unit of measurement and a second value from the second set of values.

13. The method of claim 12, further comprising:
rendering the smart object in accordance with the applied transformation.

14. A method, comprising:
displaying a smart object having one or more control points positioned in pre-defined locations on a 3D graphics object representing the smart object, a control point including a pre-defined transformation configured for application to the smart object; and
upon detection of a user interaction with the control point to initiate the pre-defined transformation, automatically displaying a first menu bar having values of a first measurement unit within the pre-defined constraint;
upon detection of a user interacting with at least one value of the first measurement unit, automatically displaying a second menu bar having subunit values of the at least one value of the first measurement unit; and
applying the pre-defined transformation with the values selected from the first menu bar and the second menu bar.

15. The method of claim 14, further comprising:
displaying a history bar representing one or more stages of applications of the one or more operations to a design surface including the smart object.

16. The method of claim 15, further comprising:
upon detection of a selection of a select one of the one or more stages, displaying rendered views of the one or more stages of the design surface.

17. The method of claim 16, further comprising:
upon detection of a selection of a select previous stage, rendering the select previous stage onto the display.

18. The method of claim 17, further comprising:
upon selection of a component of a history bar, displaying transformations applied during time period associated with the component.

19. The method of claim 14, further comprising:
displaying a history bar representing one or more stages of operations applied to a design surface, the history bar including one or more components, a size of a component representing a time period of one or more applied transformations.

20. The method of claim 14, further comprising:
upon selection of an undo operation, displaying a history bar representing one or more stages of operations applied to a design surface.

21. The method of claim 20, further comprising:
configuring the history bar to be scrolled in a forward direction and a backward direction through the one or more stages.

* * * * *